E. M. SAWTELLE.
GANG LAWN MOWER.
APPLICATION FILED JAN. 16, 1917.
1,285,412.
Patented Nov. 19, 1918.
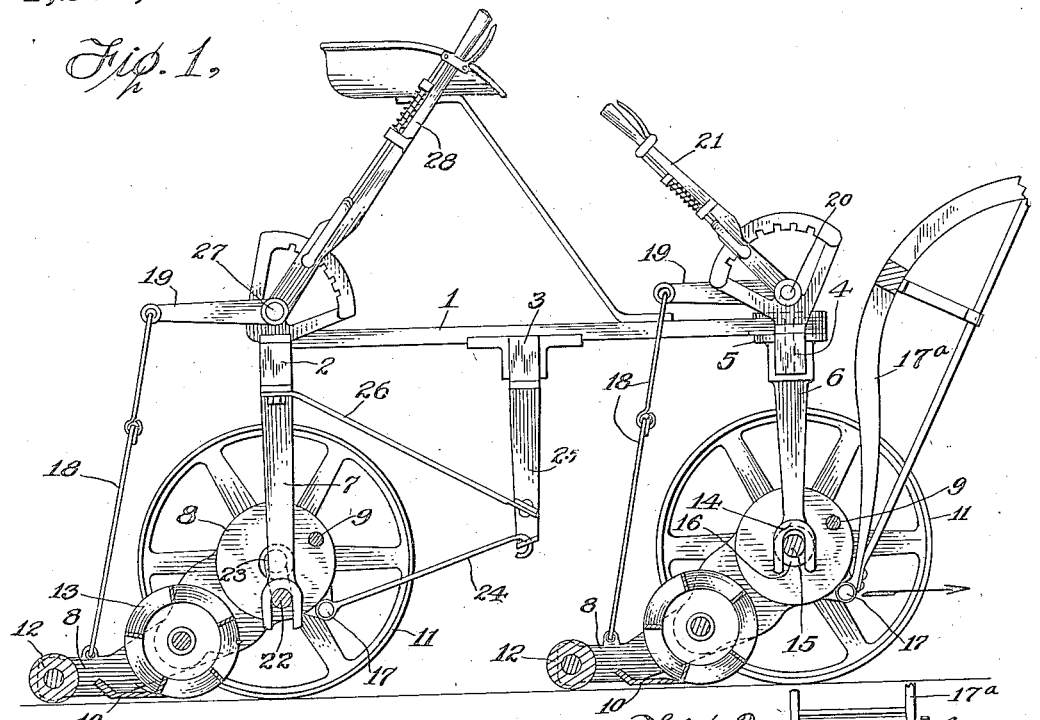
Fig. 1.
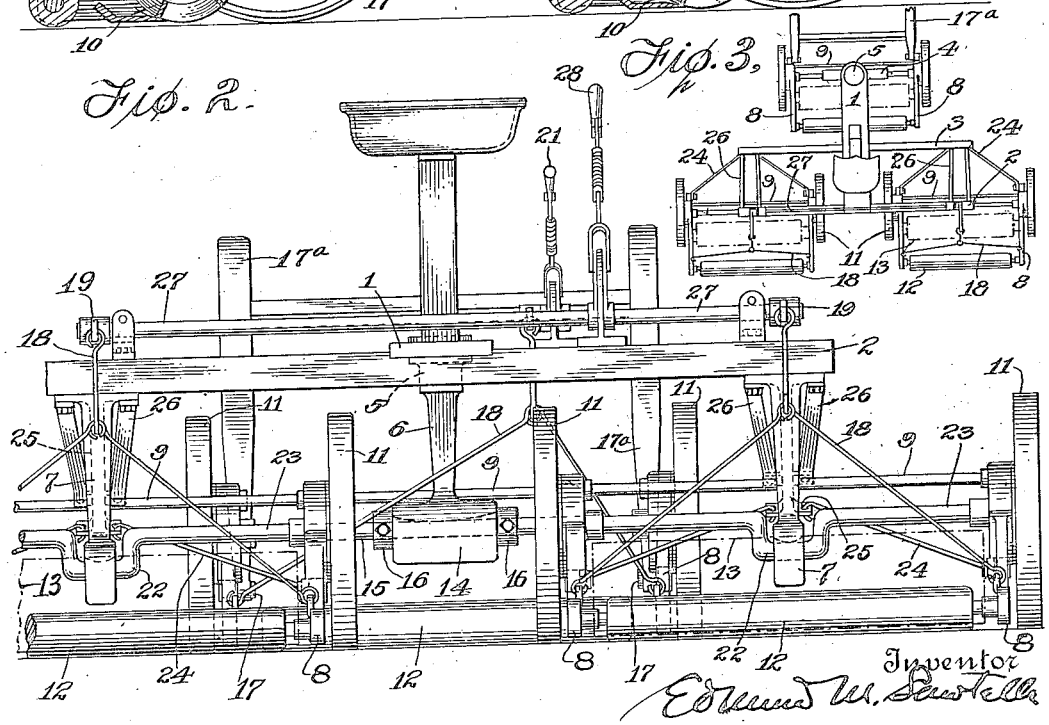
Fig. 2.
Fig. 3.
Inventor
Edmund M. Sawtelle
By
Attorney

UNITED STATES PATENT OFFICE.

EDMUND M. SAWTELLE, OF ENGLEWOOD, NEW JERSEY.

GANG LAWN-MOWER.

1,285,412.  Specification of Letters Patent.  Patented Nov. 19, 1918.

Application filed January 16, 1917. Serial No. 142,581.

*To all whom it may concern:*

Be it known that EDMUND M. SAWTELLE, United States citizen, residing in Englewood, New Jersey, has invented the following-described Improvements in Gang Lawn-Mowers.

This invention is an improvement in gang lawn mowers of the general type set forth in Patent No. 1,210,879 granted January 2nd, 1917, to C. C. Worthington and consists in the organization of the gang mower units, main frame and draft means in such manner as to impart a downward pressure to the cutter mechanism of each unit which is independently and automatically proportional to the work each unit is called on to perform, so that the said cutter mechanisms are not only prevented from jumping in thick grass but are pressed more strongly toward the ground on such occasions than when cutting thin grass. By such arrangement the said invention obtains the advantage of the springs shown in the said Worthington patent without the attendant expense and complication and without added weight, and the further advantage that the downward pressure is exerted independently on each unit and only to the extent required by the grass encountered, and that in consequence less draft pull is required than when all the units are under a constant spring pressure, adjusted to meet the maximum requirements. This object is obtained by coördinating the frame and units to the draft means of the machine whereby the traction pull is transmitted to the mower units in such relation to the frames thereof as to tend to swing the cutters about the axes of the ground wheels and toward the ground. The accompanying drawing, which is merely illustrative of the principle of my invention in its present preferred form, will be sufficient to indicate how the said principle may be otherwise practically applied to gang lawn mowers within the invention.

In these drawings, Figure 1 illustrates a gang lawn mower in side elevation with the front and rear units in vertical section;

Fig. 2 represents a rear elevation of Fig. 1; and

Fig. 3 a top plan on smaller scale.

The main frame consists of a reach-piece 1, two cross-beams 2 and 3, a front cross-beam 4 joined to the forward end of the reach-piece by a fifth wheel joint 5, and a number of bearing or supporting posts, marked 6 for the front unit and 7 for the rear units. By means of these posts the main frame of the machine rests upon the three mower units constituting the gang in the present case. Each unit is or may be the conventional type of lawn mower as will be recognized in the drawing without description, and each consists essentially of a unit frame composed of the side plates 8 and two or more frame cross members 9 and 10, the forward end of such frame being carried on the ground wheels 11 and the rear end, normally, on the wiper roller or rollers 12, the rotary cutter mechanism 13 being journaled at an intermediate point in the frame and driven by the ground wheels through gear trains concealed within one or both of the side plates.

The front cross-beam 4 is disposed directly over the wheel axis of the front unit and is supported centrally thereon by its bearing post 6, the lower end of which terminates in a fork 14 straddling the cross-bar 15 between collars 16 set screwed thereon. This support allows the front unit to tilt in the vertical plane of said cross-bar 15 according to undulations encountered in the lawn surface to be mowed and substantially as in the patent above referred to, but it will be apparent that other means of permitting such accommodation are also within this invention. The rear part of the unit frame, carrying the rotary cutter mechanism 13, is also free to rise and fall or swing vertically about the axes of the ground wheels as commonly the case in lawn mower units, and by such movement the cutter mechanism is further rendered self-accommodating to the undulating ground surface, as will be understood. In the patent referred to the said cutter mechanism is pressed toward the ground by the action of a spring, the tension of which is adjusted by the operator according to his judgment of the grass to be cut. In the present invention such holding down pressure is exerted by the pull of the horse shafts 17$^a$ or whatever traction means is provided and by attaching the said shafts to the unit frame at a point below the wheel axis as indicated at 17, so that the forward pull in the direction of the arrow (Fig. 1) acts on the unit frame as a lever, the fulcrum of which is the wheel axis and the working arm of which is represented by the trailing part of the unit frame which carries the cutter mechanism. Such part is thereby pressed toward the ground substantially proportional to the force of the draft pull and as the draft pull varies with the thickness or toughness of the grass, the holding-down pressure will vary accordingly. In the present case the shafts are pivoted to the studs 17 and the latter are carried as short radial extensions from the side plates or gear casings 8 of the unit frame. The cutter mechanism of the front unit, thus held to the ground when in action, is adapted to be lifted by the operator to different elevations from the ground to enable the machine to make different heights of cut or to raise the cutter entirely out of cutting relation, and the means for this purpose comprise a bridle of links 18 attached to the rear part of the unit frame and connected to the arm of a lever 19 on a short rock shaft 20 journaled on the beam 4. The rock shaft is provided with an operating handle 21 and a segment rack and lock disposed at one side of the operator's seat, it being apparent that the operator may thereby raise the cutter mechanism to any desired elevation from the ground and sustain it at such elevation against the downward pressure exerted by the draft means.

The two rear units support the opposite ends of the cross-beam 2, through their posts 7, in substantially the same manner as in the case of the front mower unit, except that in these units the forked ends of the bearing posts rest in stirrups 22 formed in the centers of the cross shafts 23, which latter are journaled in the unit frame substantially concentric to the wheel axes thereof. The draft lugs 17 of these units are connected by pull rods 24 to the lower ends of the brackets 25 depending from the ends of the cross-beam 3, centrally in front of each unit and the said brackets are appropriately stayed to the cross-beam 2 by the braces 26 and otherwise as required for adequate frame rigidity. It will be apparent that the rear units as thus connected to the main frame are free to tilt vertically in the planes of their respective wheel axes in accommodation to ground undulations and that the draft pull is exerted upon them through the frame brackets 25, and the pull rods 24 to the draft lugs 17, which latter being below the level of the wheel axes, transmit downward pressure to the cutter mechanisms which is proportional to said draft pull as already described. The stirrup formation of the cross shaft 23, as will be observed, provides a sufficient relative motion between the wheel axis and the bearing post 7, in a fore and aft direction to permit unimpeded transmission of such pressure and also permits the lifter mechanism of these rear units to be operated without tending to put the main frame under strain. However, the relative motion required is very slight and special allowance for it is shown more as a matter of desirability of design than as a strict necessity. The lifter mechanism of the rear units comprises bridle links 18, lifter arms 19 carried by the rock shaft 27 and controlled by a hand lever 28 secured to said shaft on the same side of the operator's seat as the control lever 21 of the front unit and also provided with a segment rack and lock. The operator's seat is secured to the reach piece 1 at such position thereon as to distribute the operator's weight substantially equally to each unit of the gang.

From the foregoing description it will be plain that the draft pull of the horse shafts is imparted to each unit of the gang through connections below their respective wheel axes and by virtue of a lever action, part of such pull is converted into holding-down pressure on the several cutter mechanisms. It will also be plain that in the present case this transmission of force takes place through instrumentalities which are independent of the means whereby the main frame is supported on the gang and it will be understood that the principle of the invention comprehends one or both of these characteristic features in whatever physical embodiment they may be capable of, the essential object being the production of a suitable holding-down pressure for each unit through the action of the draft pull rather than through the weight of the superposed framework or the interposition of springs between the same and the mower units.

Having described the invention the following is claimed:

1. In a gang lawn mower, a gang of lawn mower units having rotary cutter mechanism driven by the ground wheels thereof and connected to and supporting a main framework, means rendering said units self-accommodating to ground undulations, in combination with draft means for said frame and units, correlated therewith to transmit a portion of the draft pull as downward pressure to the cutter mechanisms of the units.

2. In a gang lawn mower, the combination of a main frame, a gang of lawn mower units having means for supporting said frame thereon and draft means imparting pressure to one or more of said units independently of the means whereby the main frame is supported upon them.

3. A gang lawn mower comprising a gang of lawn mower units each comprising a unit frame, ground wheels and rotary cutter mechanism driven thereby, a main frame, and draft means connected to the frame of a front unit below the wheel axis thereof.

4. In a gang lawn mower, the combination of a main frame, a gang of mower units supporting the same, each comprising a unit frame, a pair of ground wheels and cutter mechanism driven thereby, a draft means for said units acting on the frames thereof through connections below the respective wheel axes thereof whereby said cutter mechanisms are urged toward the ground substantially in proportion to the draft pull thereon.

5. In a gang lawn mower, a gang of lawn mower units having cutter mechanisms driven by the ground wheels thereof and connected to and supporting a main frame by means rendering said units self-accommodating to ground undulations, in combination with draft means for said frame and units connected to transmit a portion of the draft pull as downward pressure to the cutter mechanisms of the units and means for supporting said cutter mechanisms at an elevation above the ground against said downward pressure.

6. In a gang lawn mower, the combination with a gang of lawn mower units each comprising a pair of ground wheels, a unit frame, and rotary cutter mechanism journaled in said frame and driven by the ground wheels, a main frame carried by said unit frames by means permitting independent tilting of the latter in accommodation to ground undulations and also permitting relative movement between the main frame and the wheel axis of one of said units in a fore and aft direction.

7. In a gang lawn mower, the combination of a superposed main frame, a gang of lawn mower units supporting said frame, one of said units comprising a pair of ground wheels, a unit frame, and a cross member of said frame providing a bearing for the main frame at a point below the wheel axis of the unit.

In testimony whereof, I have signed this specification.

EDMUND M. SAWTELLE.